US012681366B2

(12) United States Patent
Inagaki

(10) Patent No.: US 12,681,366 B2
(45) Date of Patent: Jul. 14, 2026

(54) ELECTRONIC APPARATUS

(71) Applicant: CANON KABUSHIKI KAISHA, Tokyo (JP)

(72) Inventor: Akinori Inagaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 225 days.

(21) Appl. No.: 18/584,898

(22) Filed: Feb. 22, 2024

(65) Prior Publication Data

US 2024/0295800 A1 Sep. 5, 2024

(30) Foreign Application Priority Data

Mar. 2, 2023 (JP) ................................. 2023-031942

(51) Int. Cl.
*G03B 17/56* (2021.01)
*G03B 17/02* (2021.01)

(52) U.S. Cl.
CPC ........... *G03B 17/563* (2013.01); *G03B 17/02* (2013.01)

(58) Field of Classification Search
CPC ... G03B 17/02; G03B 17/563; B01D 2279/45
See application file for complete search history.

(56) References Cited

U.S. PATENT DOCUMENTS

| | | | | | |
|---|---|---|---|---|---|
| 4,926,207 A | * | 5/1990 | Eguchi | ................... | G03B 17/02 |
| | | | | | 396/420 |
| 5,426,478 A | * | 6/1995 | Katagiri | ................. | G03B 15/05 |
| | | | | | 396/176 |

| | | | | | |
|---|---|---|---|---|---|
| 5,563,674 A | * | 10/1996 | Von Holtz | ............. | G03B 17/02 |
| | | | | | 396/540 |
| 5,564,316 A | * | 10/1996 | Larson | ................... | B62K 21/26 |
| | | | | | 74/489 |
| 5,708,897 A | * | 1/1998 | Manabe | ................. | G03B 17/02 |
| | | | | | 396/535 |
| 5,857,387 A | * | 1/1999 | Larson | ................... | B62M 25/04 |
| | | | | | 74/489 |
| 5,917,545 A | * | 6/1999 | Kowno | ................ | H04N 1/2112 |
| | | | | | 348/E5.025 |
| 2006/0010803 A1 | * | 1/2006 | Suzuki | ................... | G03B 17/02 |
| | | | | | 52/390 |
| 2006/0133798 A1 | * | 6/2006 | Palmer | ................... | G02B 23/12 |
| | | | | | 348/30 |
| 2009/0206077 A1 | * | 8/2009 | Melmon | ................ | G03B 19/18 |
| | | | | | 396/535 |

(Continued)

FOREIGN PATENT DOCUMENTS

| | | | | |
|---|---|---|---|---|
| JP | S623238 A | * | 1/1987 | |
| JP | 2017114180 A | | 6/2017 | |

*Primary Examiner* — Timothy J Thompson
*Assistant Examiner* — Rhadames Alonzo Miller
(74) *Attorney, Agent, or Firm* — Cowan, Liebowitz & Latman, P.C.

(57) ABSTRACT

An electronic apparatus includes a first exterior member, and a second exterior member made of a material softer than that of the first exterior member and held by the first exterior member. A plurality of main convex portions are formed on a surface of the second exterior member. A plurality of sub convex portions each having a smaller shape than that of each of the main convex portions are formed on a surface of at least part of the plurality of main convex portions.

11 Claims, 5 Drawing Sheets

(56) References Cited

U.S. PATENT DOCUMENTS

| | | | | |
|---|---|---|---|---|
| 2012/0069458 | A1* | 3/2012 | Kurobe | G02B 7/04 |
| | | | | 359/822 |
| 2013/0002924 | A1* | 1/2013 | Nakajima | H04N 23/68 |
| | | | | 348/333.02 |
| 2013/0057720 | A1* | 3/2013 | Kawaji | G03B 17/02 |
| | | | | 348/222.1 |
| 2013/0323471 | A1* | 12/2013 | Maeda | G03B 17/563 |
| | | | | 428/166 |
| 2017/0123299 | A1* | 5/2017 | Tonev | G03B 5/00 |
| 2017/0252833 | A1* | 9/2017 | Bayona Salazar | B25F 5/026 |
| 2021/0165307 | A1* | 6/2021 | Nakagawa | G03B 17/566 |
| 2022/0353395 | A1* | 11/2022 | Zhuang | G03B 13/02 |
| 2024/0368394 | A1* | 11/2024 | Otani | C08L 33/12 |
| 2025/0314951 | A1* | 10/2025 | Wu | G03B 17/566 |

* cited by examiner

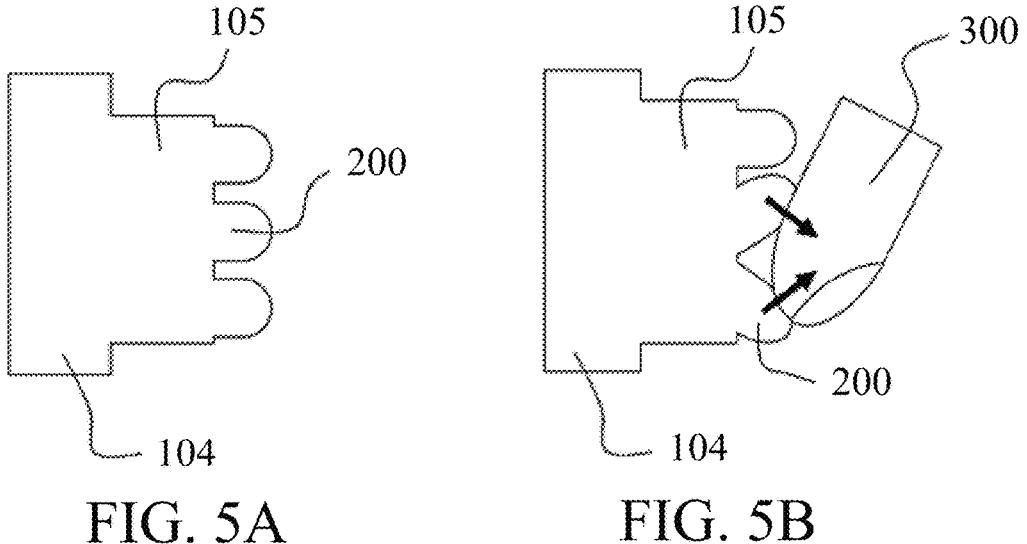
FIG. 5A                    FIG. 5B
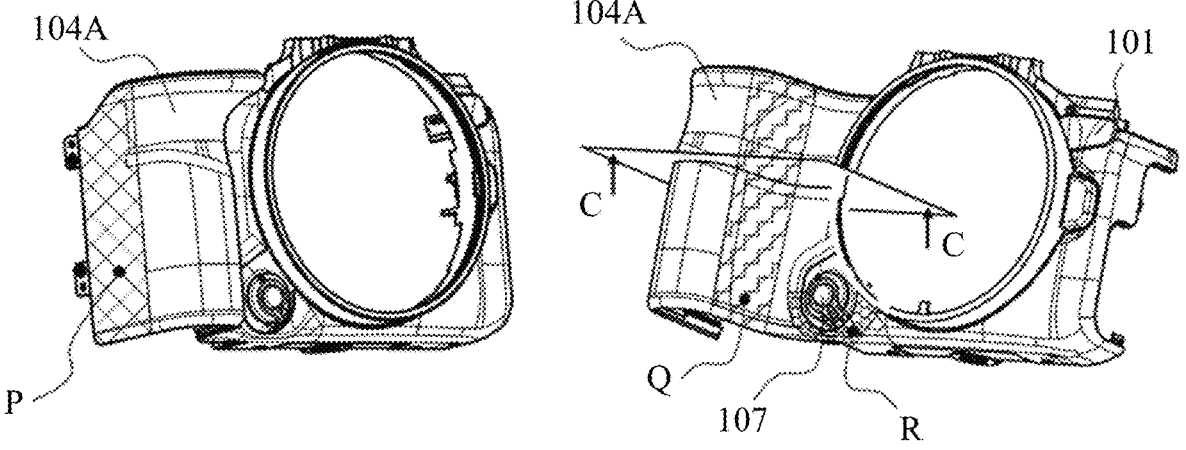
FIG. 6

ELECTRONIC APPARATUS

BACKGROUND

Technical Field

One of the aspects of the embodiments relates to an electronic apparatus, such as an image pickup apparatus (e.g., a lens interchangeable type camera).

Description of Related Art

A grip portion to be gripped by a user on an electronic apparatus has a soft exterior member made of a soft material such as rubber in order to improve the holding (gripping) feeling. The surface of the soft exterior member is embossed to improve its design and ease of grip, and to make scratches and dirt less noticeable. Japanese Patent Laid-Open No. 2017-114180 discloses an electronic apparatus that changes the embossing density distribution for each area on the surface of the soft exterior member.

The texture (tactility, adhesion feelings, etc.) can be changed for each area by changing the embossing density distribution for each area, but this method may negatively affect the design of the entire grip portion.

SUMMARY

An electronic apparatus according to one aspect of the embodiment includes a first exterior member, and a second exterior member made of a material softer than that of the first exterior member and held by the first exterior member. A plurality of main convex portions are formed on a surface of the second exterior member. A plurality of sub convex portions each having a smaller shape than that of each of the main convex portions are formed on a surface of at least part of the plurality of main convex portions.

Further features of the disclosure will become apparent from the following description of embodiments with reference to the attached drawings.

BRIEF DESCRIPTION OF THE DRAWINGS

FIGS. 5A and 5B are partially enlarged views of FIG. 4.

FIG. 6 is a perspective view of an image pickup apparatus according to Example 2.

DESCRIPTION OF THE EMBODIMENTS

Referring now to the accompanying drawings, a detailed description will be given of embodiments according to the disclosure.

Example 1

Figure 1:
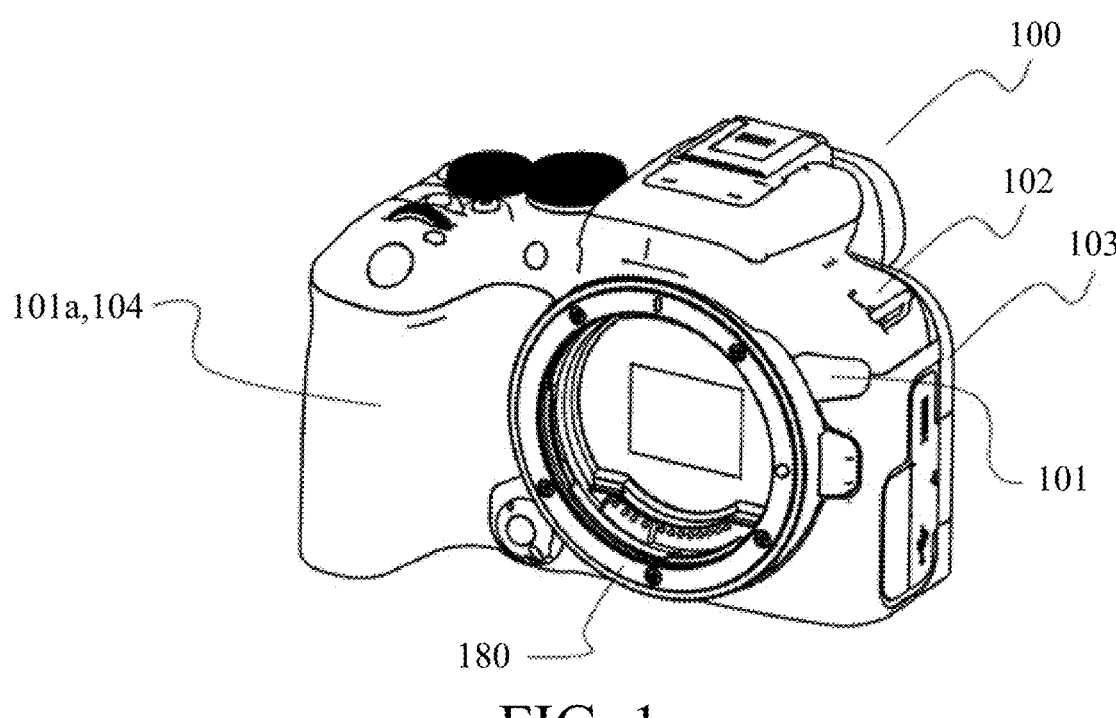
FIG. 1 is a perspective view illustrating an image pickup apparatus according to Example 1.

FIG. 1 illustrates the overview of an image pickup apparatus 100 as an electronic apparatus. The image pickup apparatus 100 is covered with a front (surface) cover 101, a top (surface) cover 102, and a back (surface) cover 103, each of which is made of resin or metal as a first exterior member. A mount portion 180 is provided on the front surface (surface on the object side) of the image pickup apparatus 100 to which a lens unit (not illustrated) is removably mounted.

On the left side of the mount portion 180 when viewed from the front of the front cover 101, a grip portion 101*a* is formed which the user grips with his or her right hand. The grip portion 101*a* is formed in a convex curved shape that extends forward from near the mount portion 180 and continues to the left side surface of the image pickup apparatus 100 when viewed from the front. A soft cover 104 as a second exterior member made of a soft material (elastic material) such as elastomer that is softer than the front cover 101 is held by adhesive or the like on the surface of the front cover 101 including the grip portion 101*a*.

Figure 2:
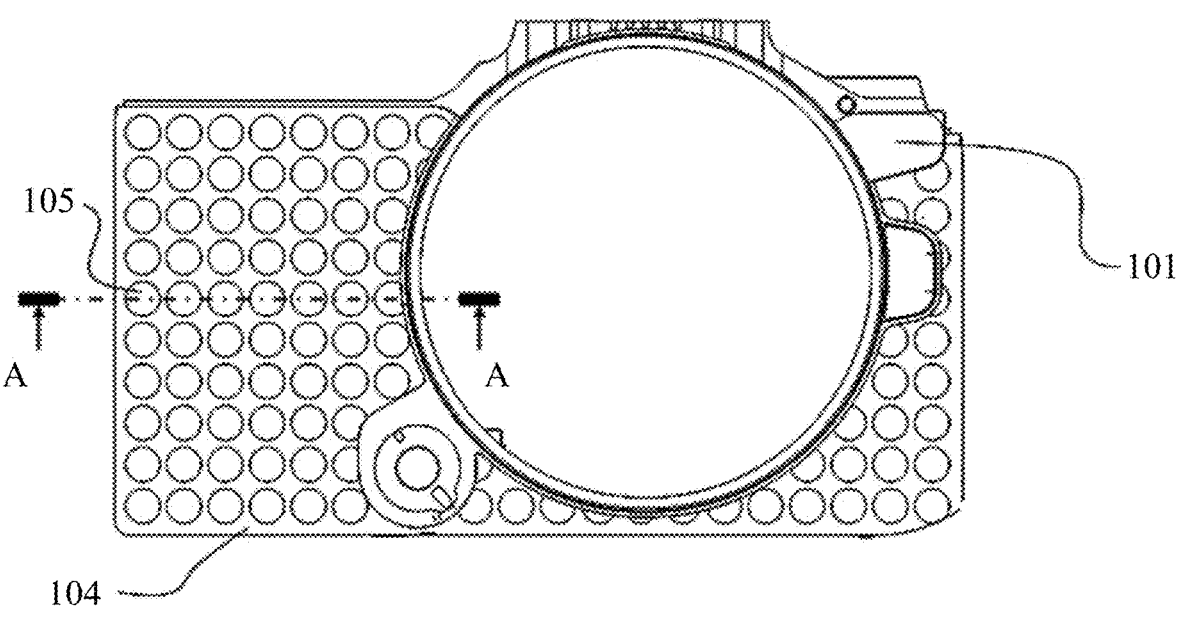
FIG. 2 is a front view illustrating a soft cover on the front (surface) side of the image pickup apparatus according to Example 1.

FIG. 2 illustrates the soft cover 104 viewed from the front. On the surface of the soft cover 104, a plurality of main convex portions 105 each having a cylindrical shape are arranged periodically at a predetermined pitch so that concave portions are formed between them. Such a shape in which convex portions and concave portions are continuous is also called embossment, and is provided to improve the design and ease of grip and to make scratches and dirt less noticeable.

As the main convex portion 105 becomes higher (the concave portion becomes deeper), the user can more easily hold it, but the appearance of the image pickup apparatus 100 becomes more rugged and the (simple) design of the image pickup apparatus 100 may lower. Therefore, increasing the height of the main convex portions 105 only in the area of the soft cover 104 that effects the gripping ease can suppress the entire rugged impression of the image pickup apparatus 100 and improve the gripping ease. However, if the heights of the main convex portions 105 differ depending on the area of the soft cover 104, the design will change depending on the area.

Accordingly, instead of increasing the heights of the main convex portions 105 in the area of the soft cover 104 that affects the gripping ease, this example provides the surface of the main convex portion 105 in that area with sub convex portions, as described below. The sub convex portion has a shape smaller than that of the main convex portion 105 and is formed, for example, by forming a fine shape on the surface of a mold for molding the soft cover 104 by irradiation with a femtosecond laser, and by transferring the fine shape onto the surface of the main convex portion 105. Thereby, the texture of the area of the soft cover 104 where the sub convex portion is formed can be made different from that of another area.

Figure 3:
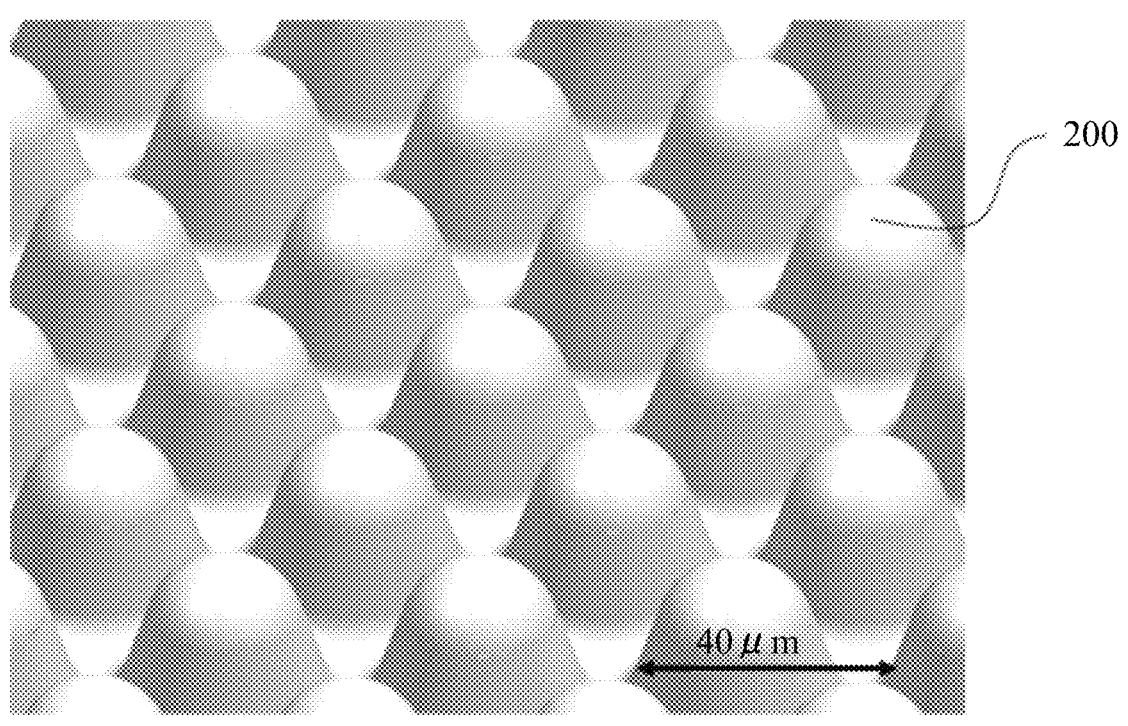
FIG. 3 is an enlarged view of a plurality of sub convex portions in Example 1.

FIG. 3 illustrates an enlarged view of the plurality of sub convex portions 200 transferred from the mold onto the surface of one main convex portion 105 in the soft cover 104. Each sub convex portion 200 has a truncated conical or cylindrical body and a hemispherical vertex provided at the tip of the body. The plurality of sub convex portions 200 are periodically arranged at a pitch of about 40 μm and have substantially the same shape. It is not necessary that all of the plurality of sub convex portions 200 have substantially the same shapes, and they may have different shapes as long as they have the effect of changing the texture of the soft cover 104.

Figure 4:
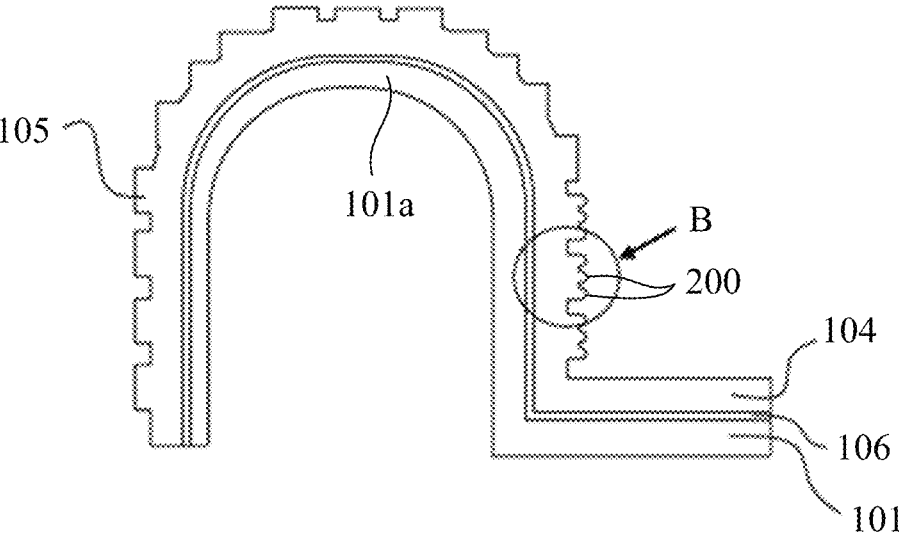
FIG. 4 is a sectional view of a front (surface) cover and the soft cover in the image pickup apparatus according to Example 1.

FIG. 4 illustrates a section taken along a line A-A in FIG. 2. The soft cover 104 is adhered to the surface of the front cover 101 with an adhesive member 106 such as double-sided tape. The soft cover 104 may be held integrally with the front cover 101 without using the adhesive member 106. For example, the soft cover 104 and the front cover 101 may be integrally molded by two-color molding.

As described above, the plurality of main convex portions 105 are formed on the surface of the soft cover 104. The plurality of sub convex portions 200 are formed on the surface of each main convex portion 105 in an area on the mount side of the grip portion 101*a* (an area that is to contact fingers of the user's right hand).

FIG. 5A illustrates an enlarged view of the main convex portion 105 in B portion in FIG. 4. As described above, the plurality of sub convex portions 200 are formed on the surface of the main convex portion 105. Each sub convex portion 200 has a cylindrical or truncated conical body and a hemispherical vertex portion provided at the tip of the body. FIG. 5B illustrates that the user's finger 300 contacts the sub convex portions 200. As the finger 300 contacts the sub convex portions 200, the sub convex portions 200 made of the soft material deforms so as to fall down. Thereby, the finger 300 contacts the side surface portion of the sub convex portions 200 instead of their tips, and the contact area between the finger 300 and the sub convex portions 200 increases. The elastic forces acting on the finger 300 cause the sub convex portions 200 that have been deformed to fall down to return to the upright state as illustrated in FIG. 5A and to press the finger 300, and increase the friction between the finger 300 and sub convex portions 200. Thereby, the texture in the area of the soft cover 104 where the sub convex portions 200 are formed can have a higher suction feeling than that of another area.

Thus, this example forms the sub convex portions 200 on the surface of part of the plurality of main convex portions 105 on the soft cover 104, suppresses the influence on the design, and makes the texture of the area that has the sub convex portions 200 different from that of another area.

Although FIG. 5B illustrates the sub convex portions 200 provided in the area of the soft cover 104 that is to contact the finger 300, the sub convex portions 200 may be provided in the area that is to contact the palm of the hand. In this example, the sub convex portions 200 are formed on part of the plurality of main convex portions 105 on the soft cover 104, but the sub convex portions 200 may be formed on all of the plurality of main convex portions 105.

Example 2

A description will now be given of Example 2. This example sets the sub convex portions 200 that deform so as to fall down when touched by a finger as illustrated in FIG. 5B to first sub convex portions 201.

Figure 7:
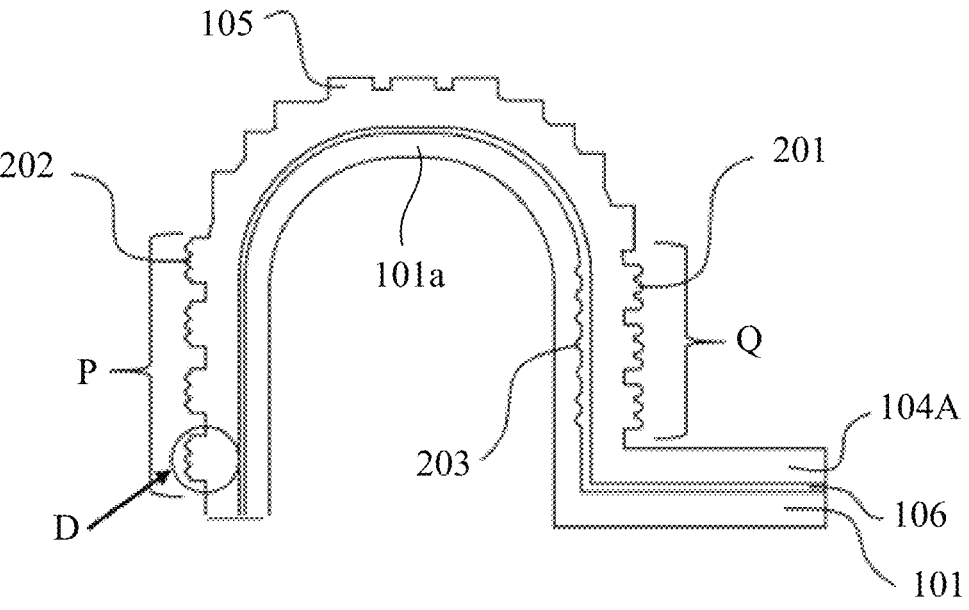
FIG. 7 is a sectional view of a front cover and a soft cover in the image pickup apparatus according to Example 2.

FIG. 6 illustrates a soft cover 104A according to this example held by the front cover 101. FIG. 6 omits the plurality of main convex portions (105) provided on the soft cover 104A. FIG. 7 illustrates a section taken along a surface C-C in FIG. 6.

In this example, the surface of the soft cover 104A has three areas. Area (second area) P is a left side surface area of the soft cover 104A that extends forward, and is an area that the palm of the user's hand holding the image pickup apparatus 100 is to contact. Area (first area) Q is a side surface area on the mount side of the soft cover 104A, and is an area that is to contact a user's hand holding the image pickup apparatus 100. Area R is an area surrounding an operation portion 107 provided near the mount portion 180 on the front cover 101, and is an area that a finger of a user who operates the operation portion 107 is to contact. The operation portion 107 is, for example, a rotatable dial.

As illustrated in FIG. 7, the first sub convex portions 201 are formed on the surface of each main convex portion 105 in the area Q, and second sub convex portions 202 are formed on the surface of each main convex portion 105 in the area P and area R. The second sub convex portion 202 will be described below. In areas other than the areas P, Q, and R, the main convex portions 105 are formed, but sub convex portions are not formed.

The first sub convex portions 201 formed on the surfaces of the main convex portions 105 of the area Q, as described in Example 1, the texture of the area Q that the user's finger is to contact has suction feeling higher than that of another area. This example forms a plurality of concave portions 203 in an area of the grip portion 101*a* of the front cover 101 that contacts the adhesive member 106 and corresponds to the area Q (overlaps the area Q via the adhesive member 106). As the adhesive member 106 enters the concave portions 203, the adhesive strength between the grip portion 101*a* and the adhesive member 106 increases due to the expansion of the adhesive area and the anchor effect. Thereby, in particular, the area Q of the soft cover 104 that is to contact the fingers can become less likely to peel off from the front cover 101. The concave portions 203 is provided, for example, by transferring a fine shape formed by femtosecond laser irradiation onto the surface of a mold for molding the front cover 101. The concave portions 203 may be formed on the entire surface of the front cover 101 that is to contact the adhesive member 106.

Figure 8:
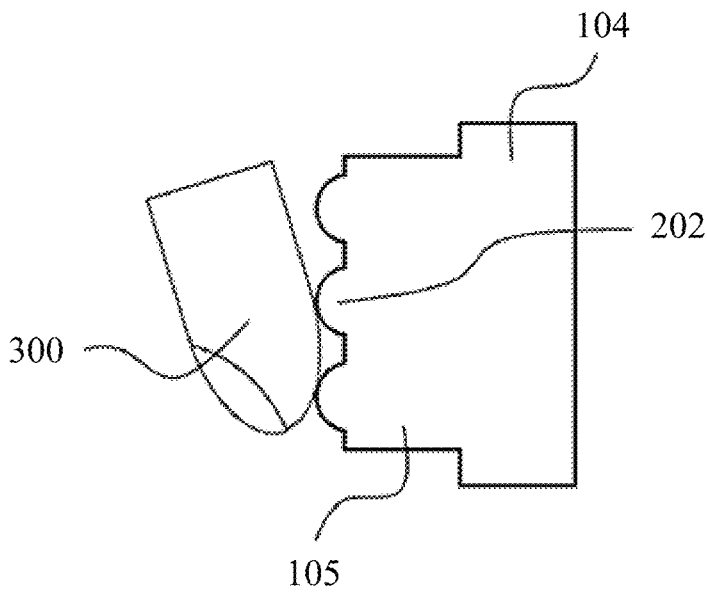
FIG. 8 is a partially enlarged view of FIG. 7.

A description will now be given of the second sub convex portions 202 formed on the surface of each main convex portion 105 in the area P. FIG. 8 illustrates an enlarged view of the main convex portion 105 in a section D in FIG. 7. Similarly to the first sub convex portions 201, the second sub convex portions 202 formed on the surface of the main convex portions 105 are formed by forming a fine shaped by femtosecond laser irradiation onto the surface of a mold for molding the soft cover 104 and by transferring the fine shape onto the surface of the main convex portion 105. The second sub convex portion 202 also has a shape smaller than that of the main convex portion 105.

The second sub convex portion 202 is lower than the first sub convex portion 201, and has a shape that does not deform to fall down even when the finger 300 contacts it (because it is harder to deform than the first sub convex portion 201). Since the finger 300 contacts the vertices of the second sub convex portions 202 with a small contact area, the friction between the finger 300 and the second sub convex portion 202 is reduced. Thereby, the texture of the area of the soft cover 104 where the second sub convex portions 202 are formed has lower friction than that of another area.

In FIG. 8, the finger 300 contacts the second sub convex portions 202, but the area P of the soft cover 104 is to mainly contact by the palm of the user who is gripping the image pickup apparatus 100. While the user operates any of the operation members of the image pickup apparatus 100 with the hand holding the soft cover 104, the second sub convex portions 202 formed in this area P maintain the smooth operation despite the friction between the soft cover 104 and the palm of the hand.

While the user operates the operation portion 107, the second sub convex portions 202 formed on the surfaces of the main convex portions 105 in the area R of the soft cover 104 maintain the smooth operation despite the friction between the soft cover 104 and the finger.

The soft cover 104 that includes the area where the first sub convex portions 201 are formed and the area where the second sub convex portions 202 are formed can suppress the negative influence on the design and form different texture for each of its areas.

The sub convex portions may be formed on the surfaces of the main convex portions 105 in areas other than the areas P, Q, and R of the soft cover 104. At this time, the shape of this sub convex portion may be made different from each of the shapes of the first and second sub convex portions 201 and 202. The first sub convex portion 201 may be formed in the area P of the soft cover 104 to enhance the adhesion to the palm.

Example 3

Figure 9:
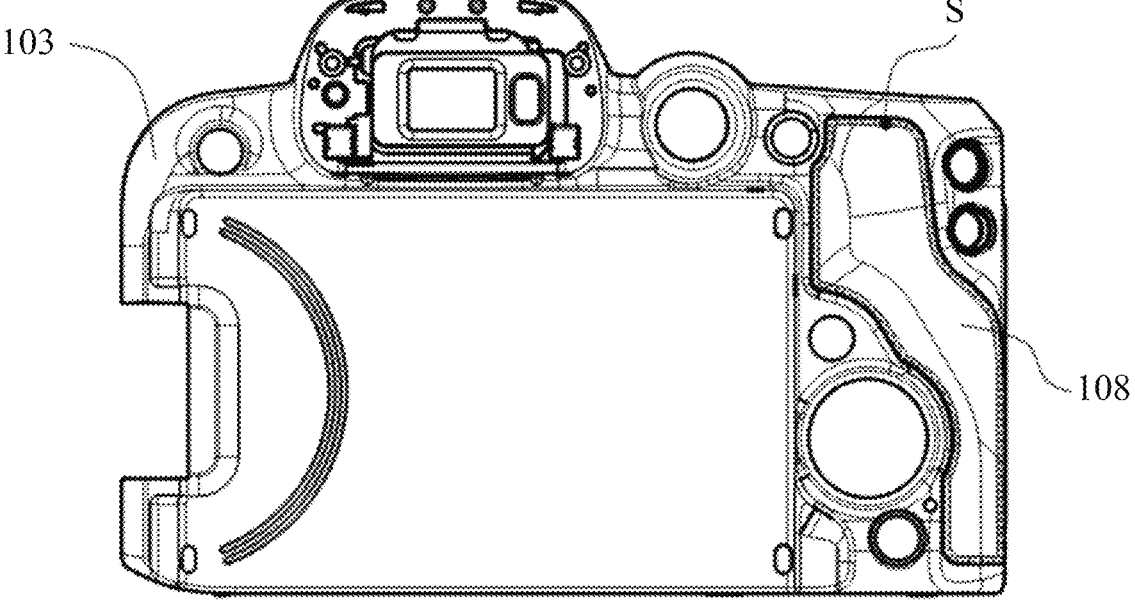
FIG. 9 is a rear view of an image pickup apparatus according to Example 3.

A description will now be given of Example 3. In this example, as illustrated in FIG. 9, the soft back cover 108 is bonded to a portion of the back cover 103 on the back side of the grip portion with an unillustrated adhesive member such as double-sided tape. The soft back cover 108 is also made of the same soft material as that of the soft cover 104 on the front surface side.

A plurality of main convex portions (105) are also formed on the surface of the soft back cover 108, similarly to the soft cover 104 on the front surface side. FIG. 9 omits the main convex portions.

Similarly to Example 2, the plurality of second sub convex portions (202) are formed on the surface of the main convex portions provided in an outer edge area S of the soft back cover 108. FIG. 9 omits the second sub convex portions. The outer edge area S is an area having texture that has lower friction with the user's fingers than that of an area inside the outer edge area S. Thereby, the outer edge area S of the soft back cover 108 becomes less likely to peel off from the back cover 103.

The second sub convex portions may be formed on the surfaces of the main convex portions in an area other than the outer edge area S of the soft back cover 108. The second sub convex portions may be formed on the surfaces of the main convex portions in the outer edge area of the soft cover 104 on the front surface side.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each example can suppress the negative influence on the design of the electronic apparatus, and form different texture for each area of the second exterior member.

This application claims the benefit of Japanese Patent Application No. 2023-031942, filed on Mar. 2, 2023, which is hereby incorporated by reference herein in its entirety.

What is claimed is:

1. An imaging apparatus comprising:
a first exterior member; and
a second exterior member made of a material softer than that of the first exterior member and held by the first exterior member,
wherein on a surface of the second exterior member,

a first region in which a plurality of main convex portions formed as an embossment, and a second region in which, on surfaces of at least some of the main convex portions in the first region, a plurality of sub-convex portions each having a shape smaller than that of the main convex portions are formed by fine machining, are provided;

the second region being disposed on at least a part, excluding an apex portion, of a surface that extends, in an optical-axis direction, from the apex portion of a grip portion having a convex curved shape formed by the first exterior member toward a mount portion; and the first region being disposed on the apex portion.

2. The imaging apparatus according to claim 1, wherein the sub convex portions are formed on surfaces of main convex portions in an area of the second exterior member that is to contact a hand of a user who grips the imaging apparatus.

3. The imaging apparatus according to claim 2, wherein each of the sub convex portions has a shape that is deformed when contacting the hand so as to increase a contact area with the hand.

4. The imaging apparatus according to claim 1, wherein and
wherein the sub convex portions are formed on surfaces of the main convex portions in an area on the grip portion of the second exterior member.

5. The imaging apparatus according to claim 1, wherein each of the sub convex portions is at least one of a first sub convex portion having a shape that is deformed when contacting a hand of a user holding the imaging apparatus so as to increase a contact area with the hand, and a second sub convex portion having a shape that is less likely to be deformed when contacting the hand than the first sub convex portion.

6. The imaging apparatus according to claim 5, wherein the first sub convex portion is higher than the second sub convex portion.

7. The imaging apparatus according to claim 5, wherein the second exterior member includes a first area in which the first sub convex portions are formed on surface of the main convex portions, and a second area in which the second sub convex portion is formed on surfaces of the main convex portions.

8. The imaging apparatus according to claim 7, wherein, wherein the first area is an area on the second exterior member that a finger of the hand is to contact, and wherein the second area is an area on the second exterior member that is to contact a palm of the hand.

9. The imaging apparatus according to claim 5, wherein the second sub convex portions are formed on surfaces of the main convex portions in an outer edge area of the second exterior member.

10. The imaging apparatus according to claim 5, wherein the first exterior member holds an operating portion operable by a finger of a user, and the second exterior member is provided in a surrounding area of the operating portion, and wherein the second sub convex portions are formed on surfaces of the main convex portions in the surrounding area.

11. The imaging apparatus according to claim 1, the second exterior member is adhered to the first exterior member with an adhesive member, and
wherein a concave portion into which the adhesive member enters is formed in an area of the first exterior member that contacts the adhesive member.

* * * * *